W. A. GREAVES.
ENGINE LATHE.
APPLICATION FILED APR. 21, 1915.
1,191,505.
Patented July 18, 1916.
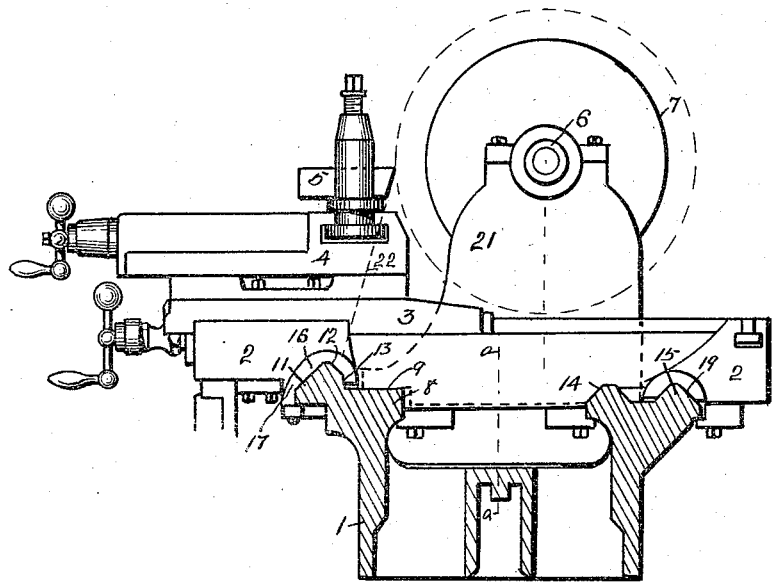
WITNESES,
M. V. Anderson.
Samuel S. Carr.
William A. Greaves, INVENTOR,
By Robert S. Carr.
Attorney.

UNITED STATES PATENT OFFICE.

WILLIAM A. GREAVES, OF CINCINNATI, OHIO.

ENGINE-LATHE.

1,191,505.  Specification of Letters Patent.  Patented July 18, 1916.

Application filed April 21, 1915. Serial No. 22,935.

*To all whom it may concern:*

Be it known that I, WILLIAM A. GREAVES, a citizen of the United States, residing at Cincinnati, Ohio, have invented a new and useful Improvement in Engine-Lathes, of which the following is a specification.

My invention relates to engine lathes and the objects of my improvements are to locate the spindles with the centers in a rearward direction beyond the center of the base and forming the rear V of the shears below the horizontal plane of the front V for the purpose of turning large diameters and at the same time maintaining the cutting tool in an advanced position with the line of its resistance between the V's; to form the upper and lower portions of the rear wall of the front V at different vertical angles for better resisting the pressure of the carriage thereon and prevent it from wearing out of true, and to provide simple and durable construction and assemblage of the co-acting members for securing facility of operation, wide range of capacity, increased accuracy and efficiency of action. These objects may be attained in the following described manner as illustrated in the accompanying drawings, in which:

The figure is a cross section of the bed looking toward the head stock and carriage of an engine lathe embodying my improvements.

In the drawings 1 is the bed of an engine lathe, 2 the carriage, 3 the cross slide, 4 the tool slide swiveled thereon, 5 the cutting tool, 6 the live spindle, and 7 the driven pulley, all being constructed and arranged in the ordinary manner.

The ledge 8 the length of the bed is formed on the inside of the front wall thereof with its top surface 9 level with the base of the front V 11. The upper portion 12 of the inner wall of said V is formed at the usual 45-degree angle from the vertical and the lower portion 13 thereof at a less angle, as for instance about 15 degrees from the vertical. Ordinary V's 14 and 15 similar to each other are formed on the rear wall of the bed with their apices terminating in the horizontal plane extended from the upper surface 9 of the ledge 8 and level with the base of the front V 11.

The groove 16 is formed in the under side of the carriage and its front wing 17 with an angle to correspond with the angular surface of the rear wall of said front V, and the rear groove 19 of the carriage is of the usual form to correspond with the rear V 15. The head stock 21 and also the tail stock (not shown) may be secured in the usual manner on the top of the ledge 8 and on the inner rear V 14 and said surface and V may be used as a guide in leveling up the lathe on the floor. The headstock is formed with the live spindle set over in a rearward direction from the central vertical line *a—a* between the carriage V's 11 and 15, and the tail stock should also be formed with its spindle set over to register with the live spindle. The position of the rear V's being in a horizontal plane a considerable distance below the front V gives clearance to work of a large diameter and permits the headstock to be formed with the live spindle proportionally nearer the bed for the same swing.

Rigidity in this class of machine tools is a prerequisite of accuracy and may be increased by compact construction. The rearward location of the centers beyond the center of the bed together with the position of the rear V's below the plane of the front V provides for swinging work of larger diameter, shown in dotted lines, and when limited only by the top surface of the carriage may be turned with the cutting tool in such an advanced position that the line 22 of thrust thereon will fall between the carriage V's and thereby prevent any tendency of tipping the carriage or lifting its rear end from contact with the rear V. The angular inner wall of the front V provides for better resisting the pressure on the tool in its line of thrust, causes more uniform wear of the carriage groove thereon and better serves to resist both the forward and also downward pressure of the carriage during heavy duty, also the torque of the carriage on the shears and the tendency of the carriage to crawl upward thereon.

Having fully described my improvements, what I claim as my invention and desire to secure by Letters Patent of the United States is:

1. An engine lathe comprising a bed having formed thereon a front V and a rear V terminating on a level with the base of said front V, a carriage movably supported on said V's, a ledge extending rearwardly from the base of the front V, a head stock supported with its front portion thereon and provided with a live spindle located a predetermined distance rearwardly of the center of the bed, and a cross slide slidably supported on the carriage and in contact therewith its entire length.

2. In an engine lathe the combination of the bed having the front V thereon formed with the lower portion of its rear face at about one-third of the inclination from a vertical plane as that of the upper portion, and a carriage formed with a correspondingly angular rear wall of its front groove adapted to slidably engage therewith, for better compensating for wear, resisting the torque of the carriage on the shears from crawling upwardly thereon and for better resisting the forward and downward thrust on the tool.

3. An engine lathe having in combination, for the purposes specified, a bed having the front carriage V thereon formed with the upper and lower portions of its rear face inclined in the same direction and at different angles to a vertical plane and at an obtuse angle to each other, a carriage having corresponding portions of the rear face of the coacting groove therein correspondingly inclined to coact with said face on the V, a head stock supported on the bed and a cross slide.

WM. A. GREAVES.

Witnesses:
S. H. RECK,
R. S. CARR.

Copies of this patent may be obtained for five cents each, by addressing the "Commissioner of Patents, Washington, D. C."